(12) United States Patent
Meredith

(10) Patent No.: US 10,754,778 B2
(45) Date of Patent: *Aug. 25, 2020

(54) CONTROL OF PRE-FETCH TRAFFIC

(71) Applicant: MIPS Tech, LLC, Santa Clara, CA (US)

(72) Inventor: Jason Meredith, Hemel Hempstead (GB)

(73) Assignee: MIPS Tech, LLC, Santa Clara, CA (US)

(*) Notice: Subject to any disclaimer, the term of this patent is extended or adjusted under 35 U.S.C. 154(b) by 398 days.

This patent is subject to a terminal disclaimer.

(21) Appl. No.: 15/488,649

(22) Filed: Apr. 17, 2017

(65) Prior Publication Data

US 2017/0220471 A1    Aug. 3, 2017

Related U.S. Application Data

(63) Continuation of application No. 14/153,223, filed on Jan. 13, 2014, now Pat. No. 9,658,962.

(30) Foreign Application Priority Data

Jan. 15, 2013    (GB) .................................. 1300646.5

(51) Int. Cl.
*G06F 12/0862*    (2016.01)
*G06F 9/38*    (2018.01)
(Continued)

(52) U.S. Cl.
CPC ...... *G06F 12/0862* (2013.01); *G06F 9/30047* (2013.01); *G06F 9/3804* (2013.01);
(Continued)

(58) Field of Classification Search
CPC ............. G06F 12/0862; G06F 12/0811; G06F 12/0897; G06F 2212/6028
(Continued)

(56) References Cited

U.S. PATENT DOCUMENTS

| | | | |
|---|---|---|---|
| 5,206,945 A | 4/1993 | Nishimukai et al. | |
| 6,308,242 B1* | 10/2001 | Kim | G06F 9/3804 711/135 |
| 6,438,656 B1* | 8/2002 | Arimilli | G06F 9/3804 711/119 |
| 6,470,427 B1 | 10/2002 | Arimilli et al. | |
| 7,533,242 B1 | 5/2009 | Moll et al. | |
| 8,683,133 B2* | 3/2014 | Sajayan | G06F 12/0862 710/32 |
| 2003/0084274 A1 | 5/2003 | Gaither et al. | |
| 2009/0019153 A1* | 1/2009 | Sebastian | G06F 17/30902 709/224 |

(Continued)

FOREIGN PATENT DOCUMENTS

| | | |
|---|---|---|
| CN | 1466716 A | 1/2004 |
| CN | 101147127 A | 3/2008 |

(Continued)

*Primary Examiner* — Titus Wong
(74) *Attorney, Agent, or Firm* — Adams Intellex, PLC

(57) ABSTRACT

Methods and systems for improved control of traffic generated by a processor are described. In an embodiment, when a device generates a pre-fetch request for a piece of data or an instruction from a memory hierarchy, the device includes a pre-fetch identifier in the request. This identifier flags the request as a pre-fetch request rather than a non-pre-fetch request, such as a time-critical request. Based on this identifier, the memory hierarchy can then issue an abort response at times of high traffic which suppresses the pre-fetch traffic, as the pre-fetch traffic is not fulfilled by the memory hierarchy. On receipt of an abort response, the device deletes at least a part of any record of the pre-fetch request and if the data/instruction is later required, a new request is issued at a higher priority than the original pre-fetch request.

19 Claims, 5 Drawing Sheets

(51) Int. Cl.

| | |
|---|---|
| *G06F 12/0891* | (2016.01) |
| *G06F 9/30* | (2018.01) |
| *G06F 12/08* | (2016.01) |
| *H04L 12/851* | (2013.01) |
| *H04L 12/911* | (2013.01) |
| *H04L 29/06* | (2006.01) |
| *H04L 29/08* | (2006.01) |
| *G06F 12/0897* | (2016.01) |

(52) U.S. Cl.
 CPC .......... *G06F 12/08* (2013.01); *G06F 12/0891* (2013.01); *H04L 47/24* (2013.01); *H04L 47/782* (2013.01); *H04L 63/168* (2013.01); *H04L 67/2842* (2013.01); *G06F 12/0897* (2013.01); *G06F 2212/602* (2013.01)

(58) Field of Classification Search
 USPC ........................................................ 710/62
 See application file for complete search history.

(56) References Cited

U.S. PATENT DOCUMENTS

| | | | | |
|---|---|---|---|---|
| 2009/0187715 | A1* | 7/2009 | Sajayan | G06F 12/0862 711/137 |
| 2009/0199190 | A1* | 8/2009 | Chen | G06F 9/383 718/102 |
| 2009/0248991 | A1* | 10/2009 | Sajayan | G06F 12/0862 711/147 |
| 2009/0248992 | A1* | 10/2009 | Sajayan | G06F 12/0862 711/147 |
| 2009/0249105 | A1* | 10/2009 | Sajayan | G06F 12/0862 713/324 |
| 2011/0040941 | A1* | 2/2011 | Diefendorff | G06F 12/0862 711/137 |

FOREIGN PATENT DOCUMENTS

| | | |
|---|---|---|
| CN | 101639725 A | 2/2010 |
| WO | 2006/124348 A2 | 11/2006 |
| WO | 2006124348 A2 | 11/2006 |

* cited by examiner

CONTROL OF PRE-FETCH TRAFFIC

BACKGROUND

In order to reduce the latency associated with accessing data stored in main memory, processors typically use a memory hierarchy which comprises one or more caches. There are typically two or three levels of cache, denoted L1, L2 and L3 and in some examples the first two caches (L1 and L2) may be on-chip caches which are usually implemented in SRAM (static random access memory) and the third level of cache (L3) may be an off-chip cache. In other examples, such as in a System on Chip (SoC), all the memory may be implemented in the same piece of silicon. The caches are smaller than the main memory, which may be implemented in DRAM, but the latency involved with accessing a cache is much shorter than for main memory, and gets shorter at lower levels within the hierarchy (with the L1 cache being considered the lowest level cache). As the latency is related, at least approximately, to the size of the cache, a lower level cache (e.g. L1) is typically smaller than a higher level cache (e.g. L2).

When a processor, or more particularly the MEM stage of the processor operation, accesses a piece of data or an instruction, the piece of data or instruction is accessed from the lowest level in the hierarchy where it is available (where the lowest level is the level closest to the processor). For example, a look-up will be performed in the L1 cache and if the item (i.e. data/instruction) is in the L1 cache, this is referred to as a cache hit. If however, the item is not in the L1 cache, this is a cache miss and the next levels in the hierarchy are checked in turn until the item is found (e.g. L2 cache, followed by L3 cache, if the item is also not in the L2 cache). In the event of a cache miss, the item is brought into the cache.

The traversing of the memory hierarchy which results from a cache miss in the lowest level cache (e.g. L1 cache) introduces a latency and to overcome this, processors may fetch data and/or instructions ahead of when they are required and this process is referred to as 'pre-fetching'. The pre-fetching may be of items (i.e. data/instructions) which are definitely going to be required by the processor in the future, items which may be required by the processor if a particular branch is taken in a program and/or items which are pre-fetched based on an alternative prediction method. Branch prediction may be used to predict which branch is likely to be taken and reduce the amount of wasted pre-fetching (i.e. where an item is pre-fetched, but is not actually used by the processor).

Out-of-order processors, for example, use branch prediction and speculative pre-fetching to allow the instructions in the predicted branch to be speculatively executed out-of-order.

The embodiments described below are not limited to implementations which solve any or all of the disadvantages of known methods of managing pre-fetch traffic.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and systems for improved control of traffic generated by a processor are described. In an embodiment, when a device generates a pre-fetch request for a piece of data or an instruction from a memory hierarchy, the device includes a pre-fetch identifier in the request. This identifier flags the request as a pre-fetch request rather than a non-pre-fetch request, such as a time-critical request. Based on this identifier, the memory hierarchy can then issue an abort response at times of high traffic which suppresses the pre-fetch traffic, as the pre-fetch traffic is not fulfilled by the memory hierarchy. On receipt of an abort response, the device deletes at least a part of any record of the pre-fetch request and if the data/instruction is later required, a new request is issued at a higher priority than the original pre-fetch request.

A first aspect provides a method of controlling traffic generated by a processor, the method comprising: attaching a pre-fetch identifier to a pre-fetch request, the pre-fetch request requesting an item from a memory hierarchy, wherein the item comprises a piece of data or an instruction; transmitting the pre-fetch request from the processor to the memory hierarchy; and in response to receiving an abort response corresponding to the pre-fetch request, removing at least a portion of data stored locally relating to the pre-fetch request.

A second aspect provides a method of controlling traffic generated by a processor, the method comprising: receiving, at a node in a memory hierarchy, a pre-fetch request from the processor, the pre-fetch request including a pre-fetch identifier and requesting an item stored in the memory hierarchy, wherein the item comprises a piece of data or an instruction; based on the pre-fetch identifier and an assessment of traffic levels within a part of the memory hierarchy, determining whether to generate an abort response corresponding to the pre-fetch request; if the assessment determines that an abort response is to be generated, generating the abort response corresponding to the pre-fetch request; and transmitting the abort response to the processor.

A third aspect provides a system comprising: a plurality of devices arranged to generate requests for items from a memory hierarchy, wherein an item comprises a piece of data or an instruction; at least a portion of the memory hierarchy; and at least one bus connecting the plurality of devices and the memory hierarchy, wherein at least one of the plurality of devices comprises: first hardware logic arranged to attach a pre-fetch identifier to a pre-fetch request, the pre-fetch request requesting an item from a memory hierarchy and transmit the pre-fetch request from the processor to the memory hierarchy; and second hardware logic arranged to remove at least a portion of data stored locally relating to a pre-fetch request in response to receiving an abort response corresponding to the pre-fetch request.

A fourth aspect provides a method of resetting a portion of a system, the method comprising: generating an abort all response in a memory hierarchy; and in response to receiving the abort all response at the processor, removing at least a portion of data stored locally relating to any unfulfilled requests for data items stored in the memory hierarchy previously sent to the memory hierarchy.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
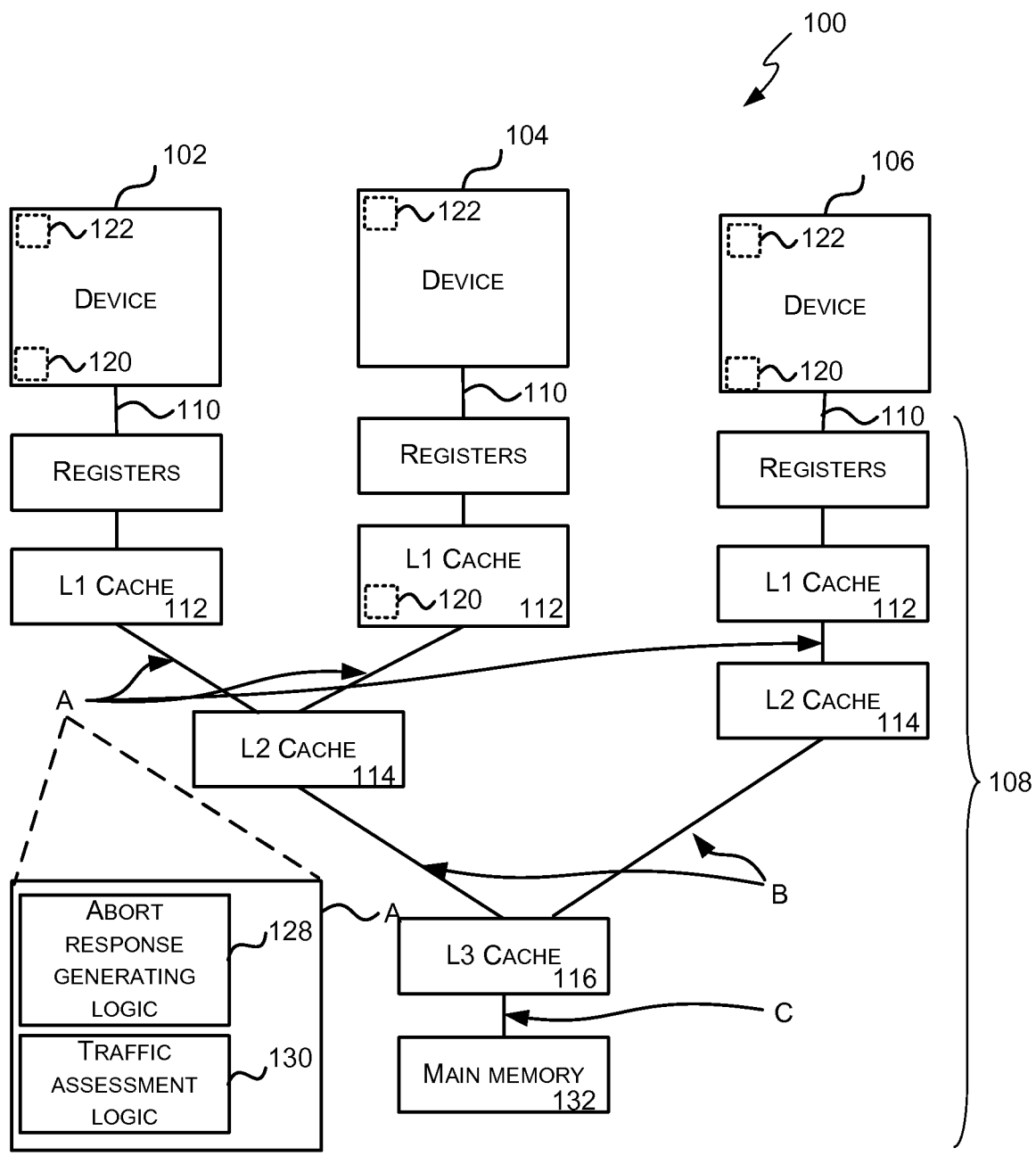
FIG. 1 is a schematic diagram of a system.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The following description relates to improved methods of controlling traffic between processors and memory and/or within the memory hierarchy. In particular, methods of controlling pre-fetch traffic are described. Hardware and/or software which may implement some or all of the method steps is also described.

As described above, processors may pre-fetch data and/or instructions from an associated memory hierarchy in order to reduce latency associated with traversing the memory hierarchy (e.g. in the event of a cache miss for the highest level cache), to increase efficiency (e.g. in the case of out-of-order processors) or for other reasons. The item (i.e. data/instruction) which is pre-fetched may definitely be required for use by the processor at a time in the future and requests for such items (i.e. data and/or instructions) may be referred to as 'definite pre-fetch requests'. Alternatively, the item which is pre-fetched may be speculative, in that there is a possibility that it may not be required by the processor. Such speculative pre-fetch requests often occur where there are branches in a program and although branch prediction may be used to identify the most likely path that the program will take, it is not guaranteed that a particular branch will be taken. Consequently, there is a possibility that any data which is pre-fetched for an instruction after the branching point and any instruction which is fetched which occurs after the branching point will not be used. Where this arises, the requests may be referred to as 'miss-predicted pre-fetch requests'.

In pre-fetching items (i.e. data and/or instructions), the processor generates pre-fetch traffic which comprises pre-fetch requests for pieces of data and/or instructions. This traffic and the corresponding responses containing the requested items from the memory hierarchy then competes with other traffic (e.g. non-pre-fetch requests and their associated responses) for a share of the capacity (e.g. bandwidth) of buses within the processor, within the memory hierarchy and between the processor and the memory hierarchy. Pre-fetches which are used by the processor produce a temporal shift in the timing of the traffic (i.e. the traffic is earlier than it would otherwise be); however, miss-predicted pre-fetch requests result in additional traffic without benefit (beyond the possibility of the prediction being successful and the pre-fetch request not being a miss-predicted pre-fetch request).

Within a system (such as a System on Chip, SoC), there may be many devices which generate pre-fetch requests. These devices may be any component which accesses a memory hierarchy, for example processors (e.g. physical processors, such as CPUs or GPUs, or virtual processors within a multi-threaded processor) or sub-components of a processor (e.g. virtual threads, execution pipelines or ALUs). Within the system there may also be devices which are intolerant to delay and generate time-critical requests for data and/or instructions and these may be referred to as 'real-time devices' or 'critical devices'. These time-critical requests are requests which impact operation of the system if they are delayed and may, for example, relate to audio, graphics or control processing, where a delay may result in a period of silence or a blank or frozen display (and hence be noticeable by a user). Some devices may generate both pre-fetch requests and time-critical requests and other devices (e.g. within a SoC) may generate only time-critical requests.

Where a system comprises one or more devices generating pre-fetch requests and at least one device generating time-critical requests, there may be periods of time where the total traffic within all or part of the system is too high to support all the time-critical requests and so some traffic has to be stalled or otherwise stopped in order to operate those requests which are immediately critical to operation of the system. It will be appreciated that although the description herein describes requests as pre-fetch or time-critical, there may be a variation in the time-criticality of non-pre-fetch requests; however all non-pre-fetch requests are required to complete.

Existing solutions stall all the traffic from a device which is deemed low priority which temporarily throttles its traffic in favour of traffic from another device. However, this will impact on the following requests in flight from the stalled device which may be of high priority and there is no method of promoting more critical requests from the stalled device. Additionally, there may be no feedback mechanism to the device so it is not aware that the traffic is being stalled or the feedback mechanism may be slow to respond (e.g. buses can detect that service is bad, but may not know why).

In some existing solutions, pre-fetch generation is throttled by restricting the number of slots which can be injected with pre-fetch traffic. However, in such solutions, this is only implemented after the reduced traffic flow has propagated back to the device and so the throttling of pre-fetch generation occurs after the point in time where the total traffic was too high.

According to the methods described herein, a pre-fetch identifier is attached to each pre-fetch request which identifies the particular request as being a pre-fetch request. As described in more detail below, there may be more than one category (or class) of pre-fetch request, for example to distinguish between speculative pre-fetches and definite pre-fetches, and so there may be more than one type of pre-fetch identifier used.

At times of high traffic, such that the capacity of buses (or other parts of the system) is constrained to a point where critical operations may be adversely impacted, the memory hierarchy issues an abort message in response to receipt of a pre-fetch request (as identified by a pre-fetch identifier). When an abort message is generated, the pre-fetch request is not fulfilled by the memory hierarchy and the abort message notifies the issuing device (i.e. the device that generated the pre-fetch request) that this has happened. Should the device require the item (i.e. data/instruction) that it attempted to pre-fetch, the device can then issue a new request for the same item at a higher level of priority (e.g. a non-pre-fetch request). This increases the chance that the device will receive the item requested (and that the request will not result in a further abort response). The new request which is issued will either not include a pre-fetch identifier (where it is a non-pre-fetch request) or will include a different identifier to the original pre-fetch request (e.g. which indicates the higher level of priority and hence promotes the request).

Using this technique, pre-fetch traffic is suppressed at periods where bandwidth is heavily utilized (e.g. by critical operations). The devices do not need to modify their pre-fetch generation algorithm and there is no requirement for large amounts of storage within the system in which non-critical requests could be stalled. Furthermore, a device will not have time-critical requests blocked behind a stalled pre-fetch request, as only the pre-fetch requests will be filtered out at times of high traffic and a device can continue to issue requests (pre-fetch or non-pre-fetch) into the system. The methods may be implemented anywhere within the memory hierarchy and may be implemented independently at multiple points within the hierarchy to enable localization of the traffic reduction (e.g. to address a particular bottleneck within the hierarchy, as there may be points in the hierarchy that experience independent periods of high traffic). The technique operates in a very dynamic way and can respond to short periods of high traffic without any significant time lag. The methods may also be used in combination with other techniques for traffic arbitration.

FIG. 1 shows a schematic diagram of a system 100 (such as a SoC) which comprises a plurality of devices 102, 104, 106 connected to a memory hierarchy 108 via one or more buses 110. Each of the devices 102, 104, 106 is capable of issuing requests for data/instructions from the memory hierarchy 108 over a bus 110 and these requests may comprise pre-fetch requests and/or time-critical requests. The devices 102, 104, 106 may, for example, comprise processors (e.g. physical or virtual processors) or sub-components of a processor (e.g. a virtual thread or an ALU) and the devices 102, 104, 106 may all be the same type of device or they may be different types of device (e.g. some may only issue time-critical requests). The memory hierarchy 108 comprises a plurality of levels of memory and in this example comprises three levels of cache L1 112, L2 114 and L3 116. Some of the caches may be shared between two or more devices and other caches may be provided separately for each device. It will be appreciated that where the system 100 is a SoC, some of the levels within the memory hierarchy 108 may be implemented off-chip or all the levels of the memory hierarchy 108 may be implemented on-chip.

The operation of the system 100 of FIG. 1 can be described with reference to FIG. 2 which shows a flow diagram of an example method of controlling pre-fetch traffic. When a device 102, 104, 106 generates a pre-fetch request (e.g. using standard techniques), a pre-fetch identifier is included within the request (block 202), for example, the pre-fetch identifier may be encoded within the request. This request, which includes the pre-fetch identifier, is then transmitted to the memory hierarchy 108 (block 204), e.g. via bus 110.

In response to receiving the request (block 206), the memory hierarchy 108 takes one of two actions (block 210 or 212) depending upon the current level of traffic. The level of traffic may be assessed (in block 208) at any point within the memory hierarchy 108 or within the system 100 and where the method of FIG. 2 is implemented at more than one point in the system or the memory hierarchy 108 (e.g. two or more of nodes A, B and C shown in FIG. 1), the level of traffic may be assessed locally to the decision point (e.g. at node A/B/C).

If the current level of traffic is not too high (e.g. not so high that it impacts time-critical operations), the request is fulfilled by the memory hierarchy ('No' in block 208 followed by block 210). However, if the current level of traffic is determined to be too high ('Yes' in block 208), the memory hierarchy 108 generates an abort response (block 212). This abort response is related directly to the request received (in block 206) and is transmitted back to the device which generated that request (block 214). In an example, the abort response comprise an ID which matches (or otherwise corresponds to) the ID of the request (which was received in block 206). When the abort response is generated (in block 212), the request that was received (in block 206) is not fulfilled and is also not stored for later processing (as is the case where requests are stalled). The pre-fetch request may therefore be described as being filtered out by the system.

The abort response which is generated by the memory hierarchy 108 (in block 212) notifies the originating device that the pre-fetch request it issued will not be fulfilled. When the device receives an abort response (block 216), the device will remove at least some of the data stored locally which relates to the pre-fetch request (block 218) and in some examples may remove all the data relating to the pre-fetch request. This data which relates to the pre-fetch request may for example be information relating to the address of the requested piece of data or instruction, the location where the requested data/instruction will be stored, etc.

Where the item (i.e. piece of data or instruction) which was requested in the original pre-fetch message is found to be required by the device ('Yes' in block 220, i.e. where the original request was not a miss-predicted pre-fetch), the device issues a new request for the item (block 222) and this new request is transmitted to the memory hierarchy 108 (e.g. as described above). This new request may, for example, be a time-critical request or other form of non-pre-fetch request in which case the new request (issued in block 222) will have a different type of identifier to the original request (generated in block 202) or may not include any identifier.

In some examples, the new request (issued in block 222) may be a pre-fetch request of a higher priority than the original request (generated in block 202) in which case, the method then repeats (as indicated by the dotted arrow from block 222 to block 204).

In implementing blocks 218-220, the device may not require any additional logic to cause the generation of a new request (in block 220) because the data relating to the pre-fetch has been removed and it is as if the original pre-fetch had not ever occurred. Existing mechanisms for generating a request for an item (i.e. data/instruction) that is required by the device can then be used to generate the new request.

Figure 2:
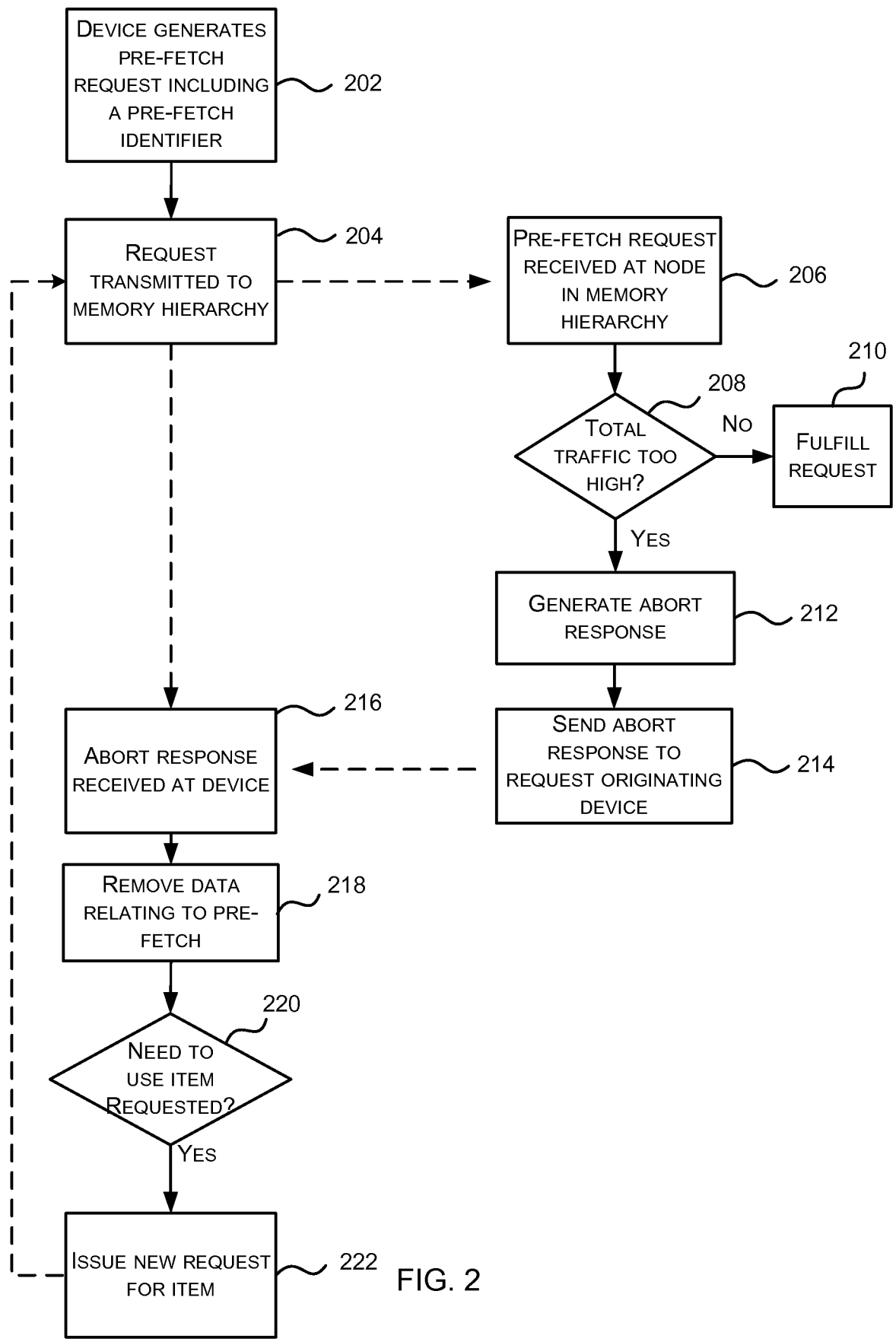
FIG. 2 is a flow diagram of an example method of controlling pre-fetch traffic.

It will be appreciated that although FIG. 2 shows the determination of whether the requested item was needed or not (in block 220) towards the end of the flow diagram, this determination may actually occur at any point after the generation of the pre-fetch request (in block 202); however, the issuing of a new request for the item (in block 222) will not be triggered until after the abort response has been received (in block 216). Where the determination of whether the requested item was needed or not (in block 220) occurs earlier, existing logic may be used to store an indication that this data is actively required, but additional logic may be provided to generate the new request (in block 222).

The identifier which is included within the pre-fetch request (in block 202) may, for example, be implemented in the 'side-band tags' which comprise an encoded set of data bits that travel with a request. Alternatively, the pre-fetch identifier may be encoded within the request in any way.

In the example shown in FIG. 2, there is a single type of identifier that indicates that a request a pre-fetch request. In some examples, there may be more than one type of pre-fetch identifier which indicates the type or class of the pre-fetch request. In an example, there may be two classes of pre-fetch request: definite pre-fetch requests and speculative pre-fetch requests, and hence two types of pre-fetch identifier (one corresponding to each class of pre-fetch request). In another example, there may be more than two classes of pre-fetch request, with the speculative pre-fetch requests divided into different classes according to the likelihood that the requested item (i.e. data/instruction) will be used by the processor (e.g. according to the confidence of the branch prediction or any other prediction used). In such an example, there may be two classes of speculative pre-fetch request: higher confidence pre-fetch requests and lower confidence pre-fetch requests. In yet further examples, the pre-fetch identifier may include a measure of the confidence of the branch prediction in which case one or more thresholds may be used to determine which pre-fetch requests are filtered out.

Figure 3:
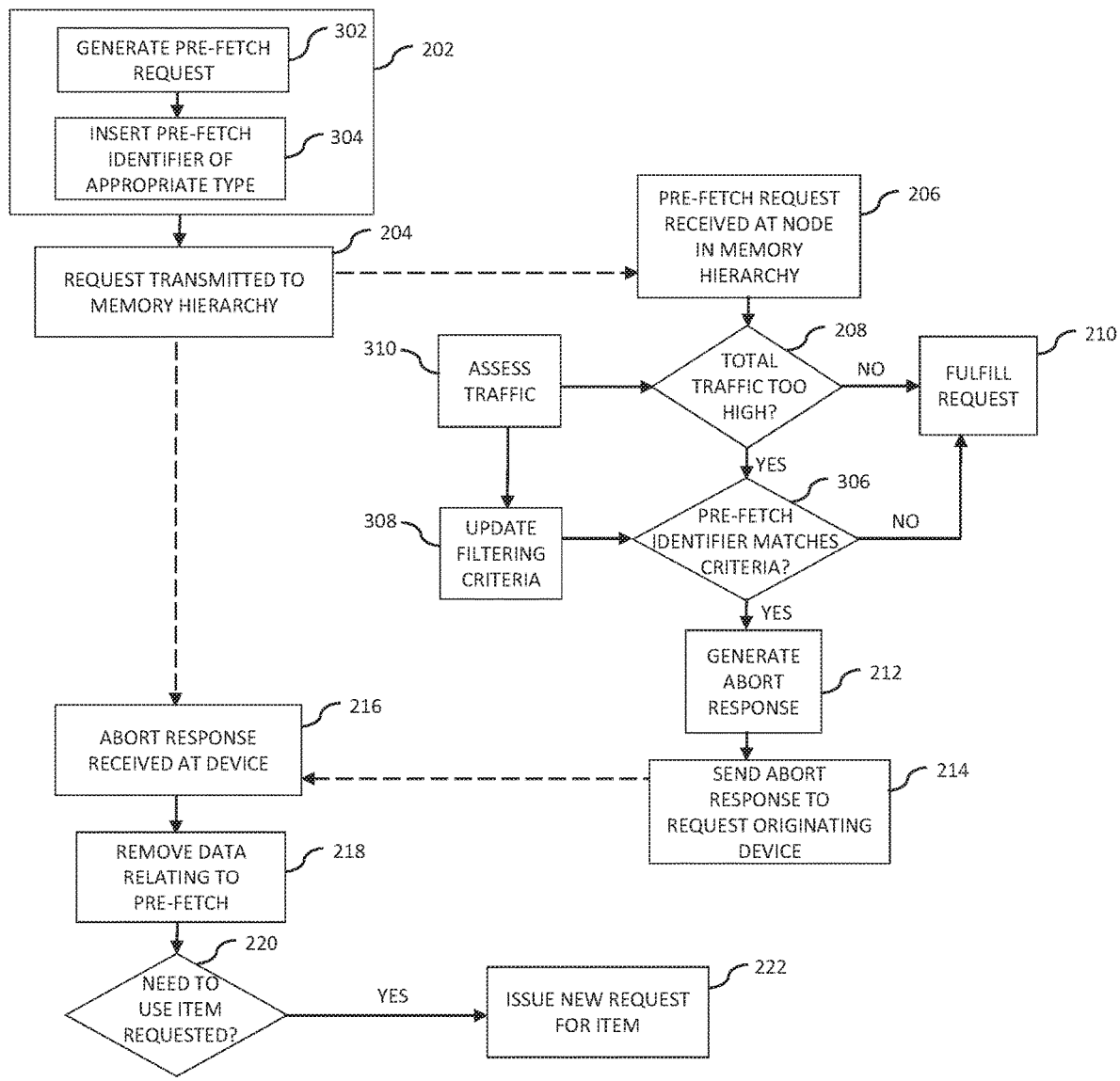
FIG. 3 is a flow diagram of another example method of controlling pre-fetch traffic.

FIG. 3 shows a flow diagram of another example method of controlling pre-fetch traffic which may also be implemented in the system 100 shown in FIG. 1. This method is a variation of that shown in FIG. 2 and common elements have the same reference numeral.

As described above, a device generates a pre-fetch request including a pre-fetch identifier (block 202); however in this example method, there is more than one type of pre-fetch identifier that may be used and so the pre-fetch request is generated (block 302) and a pre-fetch identifier of an appropriate type is included within the request (block 304). As described above, the pre-fetch identifier may be encoded within the side-band tags or another method may be used to encode a pre-fetch identifier within the pre-fetch request.

In the method shown in FIG. 3, the memory hierarchy again filters the pre-fetch traffic based on the pre-fetch identifier included within each pre-fetch request; however in this method, all pre-fetch traffic may be filtered out (through issuance of an abort response in block 212) or only some of the pre-fetch traffic (i.e. not all the pre-fetch traffic) may be filtered out.

On receiving a pre-fetch request (in block 206), if the total traffic is not too high ('No' in block 208), the request is fulfilled (block 210). If, however, the total traffic is too high ('Yes' in block 208), an additional filtering step occurs (block 306), such that abort responses are only issued (in block 212) for pre-fetch responses where the pre-fetch identifier matches defined criteria ('Yes' in block 306). Where these filtering criteria are not satisfied ('No' in block 306), the pre-fetch request is fulfilled (block 210). The filtering criteria (which are used in block 306) may be fixed or dynamic and may, for example, filter out only those pre-fetch requests which are speculative, such that all definite pre-fetch requests are fulfilled (in block 210).

Where the filtering criteria (which are used in block 306) are set dynamically, they may be set (in block 308) based on an assessment of the total traffic (in block 310), where as described above, this total traffic may be assessed locally to the decision point which implements the method. In an example, the memory hierarchy may, in response to high levels of total traffic, initially filter out (and not fulfil) only the speculative pre-fetch requests. If the filtering out of the speculative pre-fetch requests does not result in the total traffic falling sufficiently that time-critical requests are not impacted, the filtering criteria may be updated (in block 308) such that additional pre-fetch requests (e.g. all pre-fetch requests) are filtered out. When the total traffic falls again (e.g. following a period of high traffic), the filtering criteria may be adjusted again (in block 308) such that some of the pre-fetch traffic is fulfilled and when traffic falls sufficiently, none of the pre-fetch requests will be blocked (as a result of a 'No' in block 208).

In examples where the pre-fetch identifier includes a confidence value associated with the request (e.g. based on the confidence of a branch prediction and where definite pre-fetch requests have an extreme value such as 100), the filtering criteria (used in block 306) may be a confidence threshold, with those requests having an identifier specifying a confidence above the threshold being fulfilled and those below the threshold being filtered out. Where the filtering criteria are set dynamically, the value of the confidence threshold may be adjusted (in block 308) based on assessment of the total traffic (in block 310).

In the examples described above with reference to FIGS. 1-3, identifiers are only included within pre-fetch requests. It will be appreciated that instead identifiers may be included in all requests for items (i.e. data/instructions) and these identifiers may denote whether the request is a pre-fetch request or a non-pre-fetch request (and in some cases, the class of pre-fetch request and/or non-pre-fetch request). Where identifiers are included in both pre-fetch and non-pre-fetch requests, the methods described herein may be applied to filter out some non-pre-fetch requests in addition to pre-fetch requests.

As shown in FIGS. 2 and 3, some parts of the methods described above (e.g. blocks 202, 204 and 216-222) are implemented by a device which generates pre-fetch requests. Alternatively, where the device that generates the pre-fetch request does not provide support for pre-fetch abort, a separate device may intercept pre-fetch requests and add in a pre-fetch identifier (thereby performing block 202)

and implement the logic required to support pre-fetch abort at this stage in the system (e.g. such that blocks 202, 204 and 216-222 are performed by the combination of this separate device and the device that generates the pre-fetch request). Other parts of the methods described above may be implemented at any point in the system and FIG. 1 shows three example positions denoted A, B and C where these other parts of the method (e.g. blocks 206-214 and 306-310) may be implemented (e.g. using additional logic 128). As described above, the method may be implemented at a single point in the system or at more than one point in the system. Where the non-device parts of the method (e.g. blocks 206-214 and 306-310) are operated at more than one point in the system, the method may be operated independently at each point and based on local total traffic levels, such that different points may use different filtering criteria (in block 306) and/or may or may not be implementing any filtering of pre-fetch requests. The exact positions where the method is implemented may be dependent upon the design of the system and the routing of the bus (or buses) within the system.

In an example, the non-device parts of the method may be implemented at one or more arbitration points in the system (e.g. within the memory hierarchy). These arbitration points control use of a bus within the system and comprise logic 130 for detecting contention and/or high traffic levels. In some examples, the method may be implemented at nodes in the system which are capable of performing Quality of Service (QoS) monitoring.

FIG. 3 shows an explicit method step of assessing traffic (block 310) and this is not shown in FIG. 2. It will be appreciated that this method block may be added to FIG. 2 or alternatively, the monitoring of traffic levels may be combined with the determination that the total traffic is too high (in block 208). Any suitable method of assessing traffic may be used, including traffic levels, QoS measurements, a measure of requests accepted in a window or a more specific measure of bandwidth consumed by the output bus. The determination of whether the traffic is too high (in block 208) may be implemented by comparing traffic measurements to one or more thresholds. For example, where the traffic measure exceeds a threshold, T, the traffic may be considered to be too high ('Yes' in block 208). In another example, there may be multiple thresholds, where if the traffic measure exceeds a first threshold, T1, only speculative pre-fetch requests are filtered out (and hence result in an abort response) and if the traffic measure exceeds both the first and a second threshold, T2, all pre-fetch requests are filtered out. In some examples, the thresholds may be different/independent and affect a subset of the request types only (i.e. not all the request types).

Figure 4:
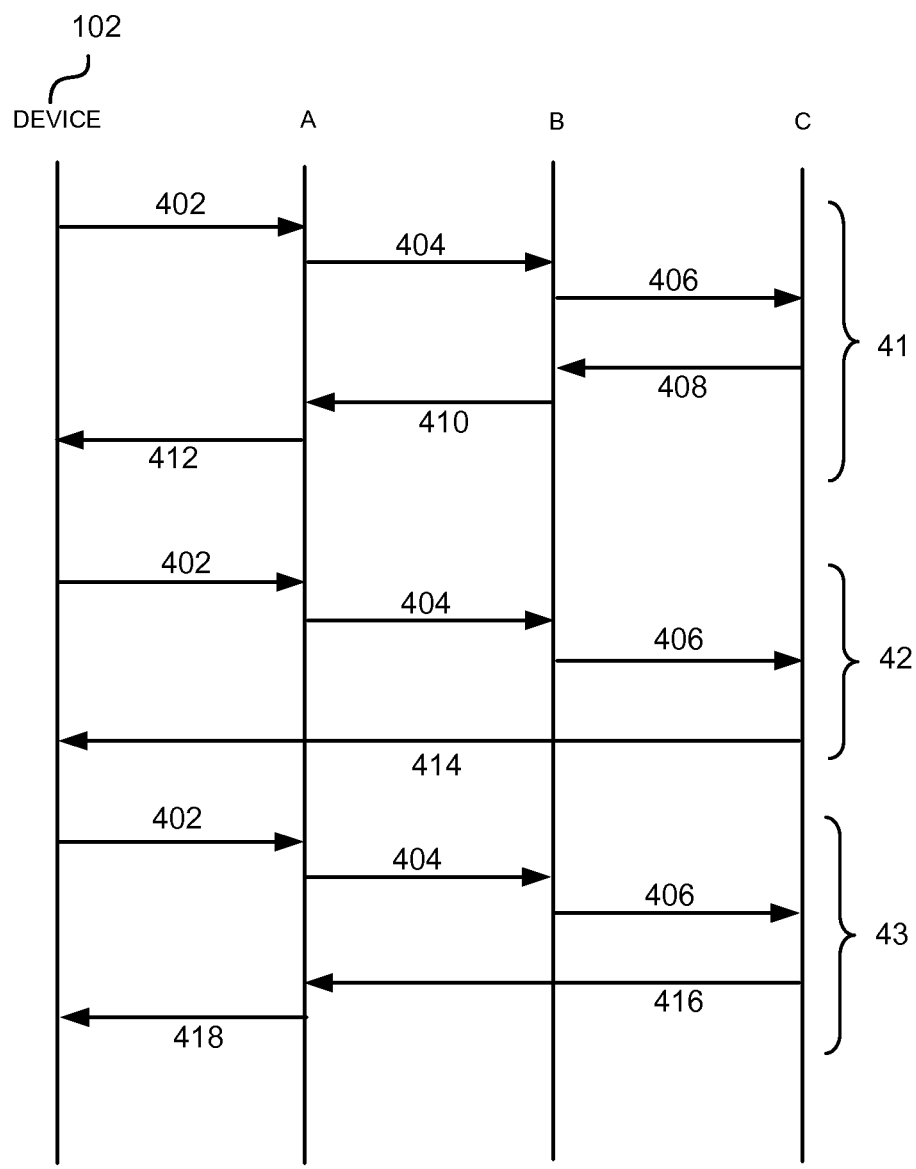
FIG. 4 is a schematic diagram showing example message flows in the system of claim 1.

FIG. 4 shows a number of example message flows in a system which implements the methods described above. In these examples, the pre-fetch request is generated (in block 202) by a device 102 and the non-device parts of the method are implemented at node C. The pre-fetch request is transmitted from the device 102 to node C via a number of intermediate points (as indicated by arrows 402-406) and FIG. 4 shows two intermediate points, nodes A and B.

In the first example message flow 41, an abort response which is generated at node C (in block 212) follows a return path (indicated by arrows 408-412) which is same as the path taken by the pre-fetch request, but in the opposite direction (e.g. via intermediate points, nodes A and B). Where the abort response follows a return path which matches the path taken by the pre-fetch request, any elements along the route (such as intermediate points, nodes A and B) which are expecting a message to pass back (i.e. they are expecting to see a response fulfilling the pre-fetch request) will see the abort message and reset their state correctly (where necessary). This may, for example, be used where the system comprises cascaded arbitration points within the memory hierarchy.

In the second example message flow 42, an abort response with is generated at node C follows a return path (as indicated by arrow 414) which is different from the outward path of the pre-fetch request (as indicated by arrows 402-406). In this example, the abort response follows a direct route and passes directly from the node C to device 102. Such a message flow may be used where there are no intermediate points on the outward path that maintain any state associated with the pre-fetch request and hence are not expecting a message to pass back from the node C to device 102.

In the third example message flow 43, the return path (as indicated by arrows 416-418) followed by the abort response generated at node C does not follow the same path as the pre-fetch request (like message flow 42) but also does not follow a direct route and instead goes via an intermediate point (node A).

It will be appreciated that the message flows shown in FIG. 4 provide only a few examples and in other examples the abort message may follow a return path via an intermediate point which is not on the outward path of the pre-fetch request, e.g. such that the return path is totally different to the outward path except for its start and finish points.

In the methods described above, a device which issues pre-fetch requests does not need to change anything associated with the generation of pre-fetch requests. The devices comprise additional hardware logic 120 to receive and react to abort responses (e.g. to implement blocks 216-218, as blocks 220-222 use existing hardware logic) and hardware logic 122 to insert pre-fetch identifiers into pre-fetch requests. As shown in FIG. 1, the additional hardware logic 120 to receive and react to abort responses may alternatively be implemented within the L1 cache. The hardware logic 122 to insert pre-fetch identifiers into pre-fetch requests may also be included in the cache levels in some implementations or wherever pre-fetch traffic is generated.

In some examples, however, a device may modify its pre-fetch behaviour in response to receiving one or more abort responses and additional hardware logic may be provided to implement this functionality. For example, a device may restrict the number of pre-fetch requests generated or only generate definite pre-fetch requests (and not speculative pre-fetch requests) for a period of time. This may reduce the number of abort responses that are generated within the system; however, if the period of excessive traffic is only short, any reduction in pre-fetch generation may unnecessarily restrict pre-fetching by the device when there is no longer congestion.

Figure 5:
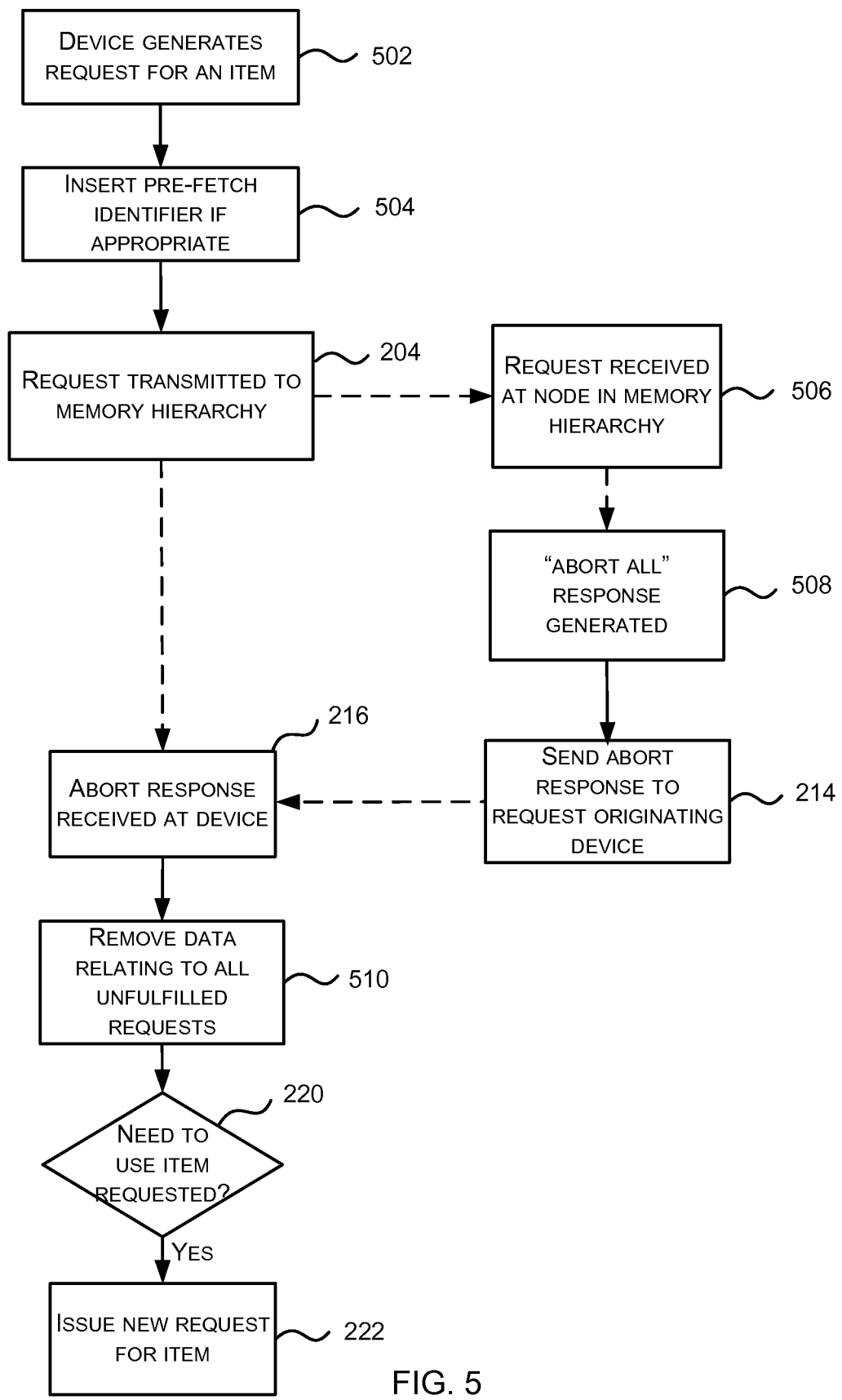
FIG. 5 is a schematic diagram showing an example method of controlling traffic.

The methods described above are used by a system to filter out pre-fetch requests in order that more important requests (e.g. time-critical requests) are not delayed or stalled as a result of congestion within the system (e.g. within a bus in the system). The methods may, however, be modified, as shown in FIG. 5, to reject all requests for data and/or instructions (i.e. all pre-fetch requests and all non-pre-fetch requests) from a particular device. The method shown in FIG. 5 may, for example, be used to assist in re-setting a part of the system, e.g. where the system is divided up into a number of different power domains, and/or to reduce power where a region is not expected to be used.

FIG. 5 shows a flow diagram of an example method of controlling traffic which may be implemented in the system 100 shown in FIG. 1. A device generates a request for an item (block 502), where the item may be a piece of data or an instruction, and the device may insert an identifier, such as a pre-fetch identifier, into the request (block 504, which is optional). The method shown in FIG. 5 does not require use of identifiers which classify a type of a request (e.g. to identify pre-fetch requests), as described above with reference to the methods shown in FIGS. 2 and 3, however, the method shown in FIG. 5 may be used in combination with the methods described previously. The request which is generated is then transmitted to the memory hierarchy (block 204).

The request is received at a node in the memory hierarchy (block 506) and as described above, this request may be a pre-fetch request or a time-critical request. In response to this, or more often in response to some other event such as a reset operation to the memory or device to which access is controlled, the node generates an abort response (block 508), however unlike the abort responses described previously, this abort response is not linked to a particular request and instead is an 'abort all' response which affects all requests which have been received from a particular device but not yet fulfilled. The abort response may also not be triggered by receipt of a particular type of request or as a consequence of high traffic levels and instead is triggered by the request being received from a particular device and involve other triggering factors (e.g. on a status event of the accessed hierarchy such as 'Reset' or 'Power Off'). The 'abort all' response is sent to the request originating device (block 214) and the response may follow a direct path, a path which matches the outward path of the request or any other path (e.g. according to any of the examples shown in FIG. 4).

On receipt of the abort response (block 216), the device removes at least some of the data (and in some examples all of the data) relating to all unfulfilled requests that target the component which issued the 'abort all' message (block 510) and not just the request which was generated in block 502. By clearing everything in this way, the device will then re-issue any requests where it needs the requested item (blocks 220-222). As described above, where a pre-fetch request has been cleared (and not fulfilled), the re-issued request may be a non-pre-fetch request. Receiving an 'abort all' message may also trigger a software or hardware operation at the device where alternative action is necessary.

The abort all response described above may be handled and sent by logic at any level of the hierarchy. For example, the L3 cache 116 shown in FIG. 1 may issue an abort all response in response to detecting that the memory access to the main memory 132 has been reset (and therefore will not respond to requests which are outstanding).

Although the methods described above may be implemented in a SoC, the methods may also be implemented in systems where some or all of the memory hierarchy is off-chip (i.e. not on the same piece of silicon as the devices generating the requests for data).

The term 'processor' and 'computer' are used herein to refer to any device, or portion thereof, with processing capability such that it can execute instructions. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A system comprising:
a plurality of devices arranged to generate requests for items from a memory hierarchy, wherein an item comprises a piece of data or an instruction;
at least a portion of the memory hierarchy; and
at least one bus connecting the plurality of devices and the memory hierarchy;
wherein said at least a portion of the memory hierarchy comprises:
abort response generating logic arranged to determine whether to generate an abort response based on a pre-fetch identifier in a pre-fetch request received from one of the plurality of devices and an assessment of traffic levels within a part of the memory hierarchy and if the determination is positive, to generate the abort response and transmit the abort response to the device from which the pre-fetch request was received.

2. The system as set forth in claim 1, wherein said at least a portion of the memory hierarchy further comprises:
traffic assessment logic arranged to compare a measure of traffic levels and one or more threshold values.

3. The system as set forth in claim 1, wherein determining whether to generate an abort response corresponding to the pre-fetch request comprises:
determining that an abort response is to be generated if a pre-fetch identifier is included within the request and if traffic levels exceed a predefined level; and
determining that an abort response is not to be generated if no pre-fetch identifier is included within the request and/or if traffic levels do not exceed the predefined level.

4. The system as set forth in claim 1, wherein determining whether to generate an abort response corresponding to the pre-fetch request comprises:
determining that an abort response is to be generated if the pre-fetch identifier satisfies filter criteria and if traffic levels exceed a predefined level; and
determining that an abort response is not to be generated if no pre-fetch identifier is included within the request, if the pre-fetch identifier does not satisfy the filter criteria and/or if traffic levels do not exceed the predefined level.

5. The system as set forth in claim 4, further comprising:
hardware logic arranged to dynamically update the filter criteria based on an assessment of traffic levels within a part of the memory hierarchy.

6. A system comprising:
a device arranged to generate requests for items from a memory hierarchy, wherein an item comprises a piece of data or an instruction; and at least a portion of the memory hierarchy, the portion comprising logic arranged to generate an abort all response;
wherein the device is further arranged, in response to receiving the abort all response, to remove at least a portion of data stored locally relating to any unfulfilled requests for data items stored in the memory hierarchy previously sent to the memory hierarchy.

7. The system as set forth in claim 6, wherein said portion of the memory hierarchy comprises an L3 cache and the L3 cache comprises the logic arranged to generate an abort all response.

8. The system as set forth in claim 6, wherein the memory hierarchy comprises main memory and the logic is arranged to generate an abort all response in response to detecting that memory access to the main memory has been reset.

9. The system as set forth in claim 6, wherein the generation of the abort all response in the logic is triggered by receipt of a request from the device.

10. The system as set forth in claim 9, wherein the generation of the abort all response in the logic is triggered by receipt of a request from the device and further involves one or more other triggering factors.

11. The system as set forth in claim 9, wherein the request is a time-critical request or a pre-fetch request.

12. The system as set forth in claim 9, wherein the request is a pre-fetch request and the device is further arranged to insert a pre-fetch identifier into the request.

13. The system as set forth in claim 6, wherein removing at least a portion of data stored locally relating to any unfulfilled requests for data items stored in the memory hierarchy previously sent to the memory hierarchy comprises:
removing all of the data stored locally relating to any unfulfilled requests for data items stored in the memory hierarchy previously sent to the memory hierarchy.

14. The system as set forth in claim 6, wherein the device is further arranged, subsequent to removing at least a portion of data stored locally relating to a request for a data item, to transmit a new request for the data item to the memory hierarchy.

15. The system as set forth in claim 14, wherein the request is a pre-fetch request and the new request is a non-pre-fetch request.

16. The system as set forth in claim 6, wherein the device is further arranged, in response to receiving the abort all response, to trigger a hardware or software operation.

17. The system as set forth in claim 6, wherein the generation of the abort all response in the logic is triggered by a status event of the memory hierarchy.

18. The system as set forth in claim 6, wherein the generation of the abort all response in the logic is triggered by a power off operation to memory within the memory hierarchy.

19. A non-transitory computer readable storage medium having stored thereon a computer readable description of hardware components that, when processed in an integrated circuit manufacturing system, causes the integrated circuit manufacturing system to manufacture a device comprising:
first hardware logic arranged to attach a pre-fetch identifier to a pre-fetch request to flag the pre-fetch request as a pre-fetch request, rather than a non-pre-fetch request, the pre-fetch request requesting an item from a memory hierarchy, wherein the item comprises a piece of data or an instruction; and
second hardware logic arranged to remove at least a portion of data stored locally to the device relating to a pre-fetch request in response to receiving an abort response corresponding to the pre-fetch request generated by a node of the memory hierarchy based on the pre-fetch identifier.

\* \* \* \* \*